United States Patent
Johnson et al.

(10) Patent No.: US 9,153,276 B2
(45) Date of Patent: Oct. 6, 2015

(54) LASER OPTICAL POWER MONITORING USING THERMAL SENSOR OF A HEAD TRANSDUCER

(71) Applicant: Seagate Technology LLC, Cupertino, CA (US)

(72) Inventors: Michael Thomas Johnson, Minneapolis, MN (US); Manuel Charles Anaya-Dufresne, Edina, MN (US); Zoran Jandric, St. Louis Park, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 13/954,142

(22) Filed: Jul. 30, 2013

(65) Prior Publication Data

US 2015/0036469 A1    Feb. 5, 2015

(51) Int. Cl.
*G11B 11/00* (2006.01)
*G11B 13/08* (2006.01)
*G11B 11/105* (2006.01)

(52) U.S. Cl.
CPC .......... *G11B 13/08* (2013.01); *G11B 11/10515* (2013.01); *G11B 11/10595* (2013.01)

(58) Field of Classification Search
CPC ............................................... G11B 2005/0032
USPC ....................... 369/13.33, 13.13, 13.32, 13.17
See application file for complete search history.

(56) References Cited

U.S. PATENT DOCUMENTS

| | | | |
|---|---|---|---|
| 6,611,487 B2 | 8/2003 | Shimano et al. | |
| 6,671,248 B2 | 12/2003 | Miyabata et al. | |
| 6,757,235 B2 * | 6/2004 | Wickramasinghe et al. | ... 369/99 |
| 6,944,112 B2 | 9/2005 | Challener | |
| 7,057,999 B2 | 6/2006 | Cheong et al. | |
| 7,077,564 B2 | 7/2006 | Schloss et al. | |
| 7,589,928 B2 | 9/2009 | Roy et al. | |
| 7,596,072 B2 | 9/2009 | Challener | |
| 7,961,417 B2 | 6/2011 | Seigler et al. | |
| 8,009,545 B2 | 8/2011 | Buechel et al. | |
| 8,149,657 B2 | 4/2012 | Huang et al. | |
| 8,355,300 B2 | 1/2013 | Grobis et al. | |
| 8,369,191 B2 * | 2/2013 | Shimazawa | ................ 369/13.26 |
| 8,391,107 B2 | 3/2013 | Gage et al. | |
| 8,400,902 B2 | 3/2013 | Huang et al. | |
| 8,411,535 B1 | 4/2013 | Hirano et al. | |
| 8,547,805 B1 * | 10/2013 | Komura et al. | ............ 369/13.33 |
| 8,654,618 B1 * | 2/2014 | Liu et al. | .................... 369/13.33 |
| 8,804,272 B1 * | 8/2014 | Dakroub et al. | ................. 360/75 |
| 8,842,383 B1 * | 9/2014 | Balamane et al. | ............... 360/31 |
| 2001/0030928 A1 | 10/2001 | Cheong et al. | |
| 2003/0169790 A1 * | 9/2003 | Chieng et al. | .................... 372/34 |
| 2005/0190496 A1 * | 9/2005 | Hamann et al. | ............... 360/128 |
| 2006/0133230 A1 | 6/2006 | Buechel et al. | |

(Continued)

*Primary Examiner* — Tan X Dinh
(74) *Attorney, Agent, or Firm* — Hollingsworth Davis, LLC

(57) ABSTRACT

A light source is configured to produce light, a waveguide is optically coupled to the light source and configured to direct the light to an intended focus location, and a slider is configured to use the light as an energy source for heating a region of a magnetic recording medium. A thermal sensor is situated on the slider at a location outside of a light path that includes the intended focus location. The thermal sensor is configured for sensing a short time constant change in temperature resulting from light source heating of the thermal sensor, wherein the sensed change in thermal sensor temperature is representative of optical intensity of the light delivered to the intended focus location.

18 Claims, 10 Drawing Sheets

(56) References Cited

U.S. PATENT DOCUMENTS

| | | |
|---|---|---|
| 2006/0221483 A1 | 10/2006 | Kamimura et al. |
| 2007/0159718 A1 | 7/2007 | Kim et al. |
| 2008/0204916 A1 | 8/2008 | Matsumoto et al. |
| 2008/0218891 A1* | 9/2008 | Gubbins et al. ............ 369/13.33 |
| 2009/0040645 A1 | 2/2009 | Shimazawa et al. |
| 2009/0225464 A1* | 9/2009 | Juang et al. ................ 369/13.33 |
| 2009/0310459 A1 | 12/2009 | Gage et al. |
| 2010/0008208 A1 | 1/2010 | Buechel et al. |
| 2010/0208378 A1 | 8/2010 | Seigler et al. |
| 2011/0122737 A1 | 5/2011 | Shimazawa et al. |
| 2011/0205864 A1 | 8/2011 | Huang et al. |
| 2011/0228651 A1* | 9/2011 | Gage et al. ................. 369/13.33 |
| 2011/0228652 A1 | 9/2011 | Gage et al. |
| 2011/0228653 A1 | 9/2011 | Shimazawa et al. |
| 2011/0299367 A1* | 12/2011 | Naniwa et al. ............. 369/13.33 |
| 2012/0008470 A1 | 1/2012 | Shimazawa et al. |
| 2012/0044967 A1 | 2/2012 | Cole et al. |
| 2012/0051196 A1 | 3/2012 | Grobis et al. |
| 2012/0082015 A1 | 4/2012 | Grobis et al. |
| 2012/0140609 A1 | 6/2012 | Huang et al. |
| 2012/0201108 A1* | 8/2012 | Zheng et al. ............... 369/13.26 |
| 2013/0088944 A1 | 4/2013 | Gokemeijer et al. |
| 2013/0286802 A1* | 10/2013 | Kiely ......................... 369/13.33 |
| 2013/0286805 A1* | 10/2013 | Macken et al. ............. 369/13.33 |
| 2014/0146647 A1* | 5/2014 | Andruet et al. ............ 369/13.33 |
| 2014/0269238 A1* | 9/2014 | Kautzky et al. ............ 369/13.33 |
| 2014/0269819 A1* | 9/2014 | Kiely et al. .................... 374/45 |

\* cited by examiner

LASER OPTICAL POWER MONITORING USING THERMAL SENSOR OF A HEAD TRANSDUCER

SUMMARY

Embodiments described in the disclosure are directed to apparatuses and methods for monitoring optical intensity of light delivered by a light source of a slider. According to various embodiments, an apparatus comprises a light source configured to produce light, and a slider configured to communicate the light to a near-field transducer that uses the light as an energy source for heating a region of a magnetic recording medium. The apparatus also comprises a thermal sensor situated on the slider at a location unexposed to the light and configured for sensing a change in temperature resulting from direct heating of the thermal sensor by the light, wherein the sensed change in thermal sensor temperature is representative of optical intensity of the light delivered by the light source.

According to other embodiments, an apparatus comprises a light source configured to produce light, a waveguide optically coupled to the light source and configured to direct the light to an intended focus location, and a slider configured to use the light as an energy source for heating a region of a magnetic recording medium. The apparatus also comprises a thermal sensor situated on the slider at a location outside of a light path that includes the intended focus location. The thermal sensor is configured for sensing a change in temperature resulting from light source heating of the thermal sensor within about 2 milliseconds after the light source has powered on, wherein the sensed change in thermal sensor temperature is representative of optical intensity of the light delivered to the intended focus location.

In accordance with further embodiments, a method comprises generating light by a light source situated in, at, or near a slider, and communicating the light from the light source through the slider and to an intended focus location of the slider. In some embodiments, the thermal sensor is situated at a location of the slider unexposed to the light. In other embodiments, the thermal sensor is situated at a location of the slider that is exposed to the light, but not within an optical path that includes the intended focus location. The method also comprises sensing, by a thermal sensor at the slider, a change in temperature resulting from direct heating of the thermal sensor by the light, wherein the sensed change in thermal sensor temperature is representative of optical intensity of the light delivered to the intended focus location.

These and other features and aspects of various embodiments may be understood in view of the following detailed discussion and accompanying drawings.

DETAILED DESCRIPTION

Figure 1:
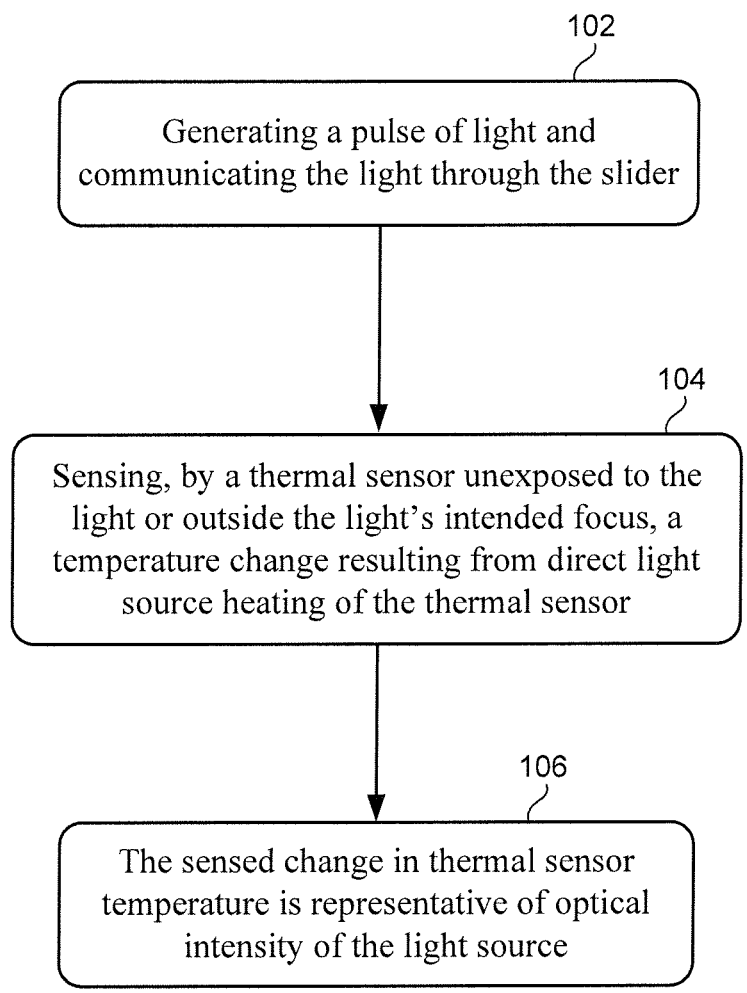
FIG. 1 is a flow chart showing various processes for monitoring optical intensity of a light source adapted for use in heat assisted magnetic recording in accordance with various embodiments.

Monitoring intensity of optical power provided by a light source is important for hard disk drive technologies that utilize heat assisted magnetic recording (HAMR). Assessing and monitoring light source heating for a HAMR head transducer can be useful for ensuring that proper power is delivered to the recording media for reliable recording. Part-to-part variations in manufacturing processes, changes in ambient conditions, as well as changes in drive operation contribute to variations in optical power provided by a HAMR light source. Such variations can be detrimental to reliability and yield of HAMR transducer design and manufacturing. Monitoring of light delivery within a HAMR head transducer as a function of time is also important for setting clearance between the head transducer and the magnetic recording media. Thermal heating from the light as well as waste heat from the light source body causes deformation of the slider of the head transducer, which causes clearance variations as a function of time. These clearance changes can be measured and characterized in order to accurately account for such changes.

Various embodiments of the disclosure are directed to apparatuses and methods for measuring the intensity of optical power of light delivered by a head transducer configured for heat assisted magnetic recording. Some embodiments of the disclosure are directed to apparatuses and methods for monitoring the intensity of optical power of light delivered by a head transducer configured for HAMR over the service life of the head transducer. Other embodiments are directed to measuring head-media clearance changes and making adjustments to head-media clearance due to thermally induced slider deformation resulting from changes in waste heat generated by a HAMR light source over time. Further embodiments are directed to calibrating (e.g., measuring and adjusting), during manufacturing and/or field use, the output of a HAMR light source so that a specified intensity of optical power is delivered by a head transducer.

Various embodiments are directed to apparatuses and methods for measuring and monitoring the intensity of optical power of light delivered by a head transducer configured for HAMR using a thermal sensor situated outside of the optical path of the head transducer and light source, such that the thermal sensor is unexposed to the light produced by the light source. Some embodiments are directed to apparatuses and methods for measuring and monitoring the intensity of optical power of light delivered by a head transducer configured for HAMR using a thermal sensor situated directly in the path of the light, but not in the light's intended focus.

According to various embodiments, an apparatus includes a light source configured to produce laser light, a slider configured to use the laser light as an energy source for heating a region of a magnetic recording medium, and a thermal sensor situated on the slider at a location unexposed to (or, alternatively, outside the intended focus of) the laser light and configured for sensing a change in temperature resulting from direct light source heating of the thermal sensor. The sensed change in thermal sensor temperature is representative of the optical power of light delivered by the light source. In various embodiments, the thermal sensor is implemented as a biased resistive sensor configured to monitor the amount of optical power being delivered by a laser diode of the light source. In some embodiments, the thermal sensor is also configured to monitor slider heating as a function of time. In both embodiments, changes in the resistance of the thermal sensor are used to determine the magnitude of the optical power delivered, as well as the rate in change of slider heating and the deformation such slider heating produces.

According to some embodiments, the thermal sensor is a dedicated component or set of components. In other embodiments, the thermal sensor is configured as a multiple-purpose component that can perform other functions as well, including but not limited to operating as the write coil or a heater of a slider for example. Thermal sensors according to these and other embodiments can be configured to monitor optical power of light delivered by a head transducer light source during one or both of the manufacturing process and as a real-time sensor used during the lifetime of the product.

In some embodiments, the signal produced by the thermal sensor (or sensors) can be measured by using several methods including measuring changes in the DC level of a time domain signal or by locking into the amplitude of the thermal sensor signal at a prescribed laser modulation frequency. The measurement method can be chosen to enhance or optimize signal response for a given head transducer design or manufacturing process. According to some embodiments, measurements such can be made to ensure proper light source coupling to optical components (e.g., waveguide, optical turning element) of the head transducer during manufacturing. Measurements can also be used to sense changes in light source coupling through the life of the system.

Referring now to FIG. 1, embodiments of the disclosure are directed to methods involving generating 102 a pulse of light and communicating the light through the slider of a head transducer. Methods also involve sensing 104, by a thermal sensor unexposed to the light (or, alternatively, outside the light's intended focus), a temperature change resulting from direct light source heating of the thermal sensor, wherein the sensed change in thermal sensor temperature 106 is representative of optical intensity of the light source.

Figure 2:
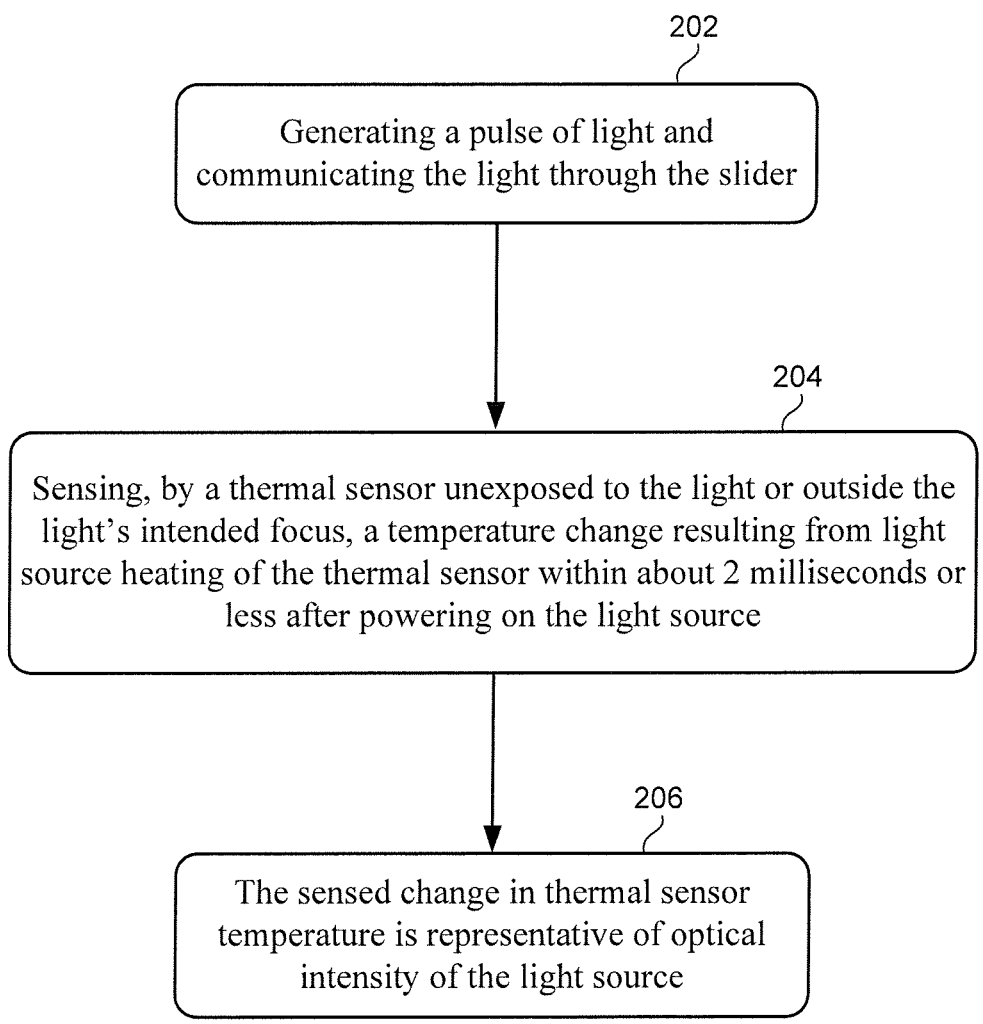
FIG. 2 is a flow chart showing various processes for monitoring optical intensity of a light source adapted for use in heat assisted magnetic recording in accordance with various embodiments.

With reference to FIG. 2, embodiments of the disclosure are directed to methods involving generating 202 a pulse of light and communicating the light through the slider of a head transducer. Methods also involve sensing 204, by a thermal sensor unexposed to the light (or, alternatively, outside the light's intended focus), a temperature change resulting from light source heating of the thermal sensor within about 2 milliseconds or less after powering on the light source. The sensed change in thermal sensor temperature 206 is representative of optical intensity of the light source.

In the context of various embodiments, direct light source heating refers to heating of the thermal sensor due to optical energy produced by the light source (e.g., heating by absorption of laser light), rather than thermal sensor heating due to light source body heating (i.e., waste heat produced by the light source). According to various embodiments, direct light source heating can be sensed as a relatively short time-scale change in thermal sensor temperature after powering on the light source. The change in thermal sensor temperature during this relatively short time frame is due to optical energy produced by the light source. In contrast, a relatively long time-scale thermal sensor temperature change after powering on the light source results from thermal sensor heating due to waste heat produced by the light source.

As in the embodiment illustrated in FIG. 2, a change in thermal sensor temperature due to direct light source heating generally occurs within about 2 milliseconds after the light source (e.g., laser diode) has been powered on. Contrastingly, a change in thermal sensor temperature due to light source heating generally occurs after about 30 milliseconds (e.g., about 30 to 100 ms) after the light source has been powered on. It will be appreciated that the thresholds defining short and long time-scales that distinguish direct light source heating from light source body heating of the thermal sensor can differ between slider designs, and that the example time scale thresholds and ranges are provided for purposes of illustration, and not of limitation.

In some embodiments, a change in thermal sensor temperature due to direct light source heating occurs within about 500 microseconds after the light source has been powered on. In other embodiments, a change in thermal sensor temperature due to direct light source heating occurs within between about 200 and 400 microseconds ($\mu s$). In further embodiments, a change in thermal sensor temperature due to direct light source heating occurs within between about 100 and 300 $\mu s$. In some embodiments, a change in thermal sensor temperature due to direct light source heating occurs within or between about 1 and 100 $\mu s$. In other embodiments, a change in thermal sensor temperature due to direct light source heating occurs within less than about 1 $\mu s$, such between about 0.05 and about 0.1 $\mu s$. In further embodiments, a change in thermal sensor temperature due to direct light source heating occurs within less than about 0.1 $\mu s$ (such between about 0.001 and about 0.09 $\mu s$). Apparatuses and methods of the disclosure are directed to sensing these and other short time-scale changes in thermal sensor temperature indicative of direct light source heating. Apparatuses and methods of the disclosure are directed to sensing such short time-scale changes as well as long time-scale changes in thermal sensor temperature in accordance with various embodiments.

Figure 3:
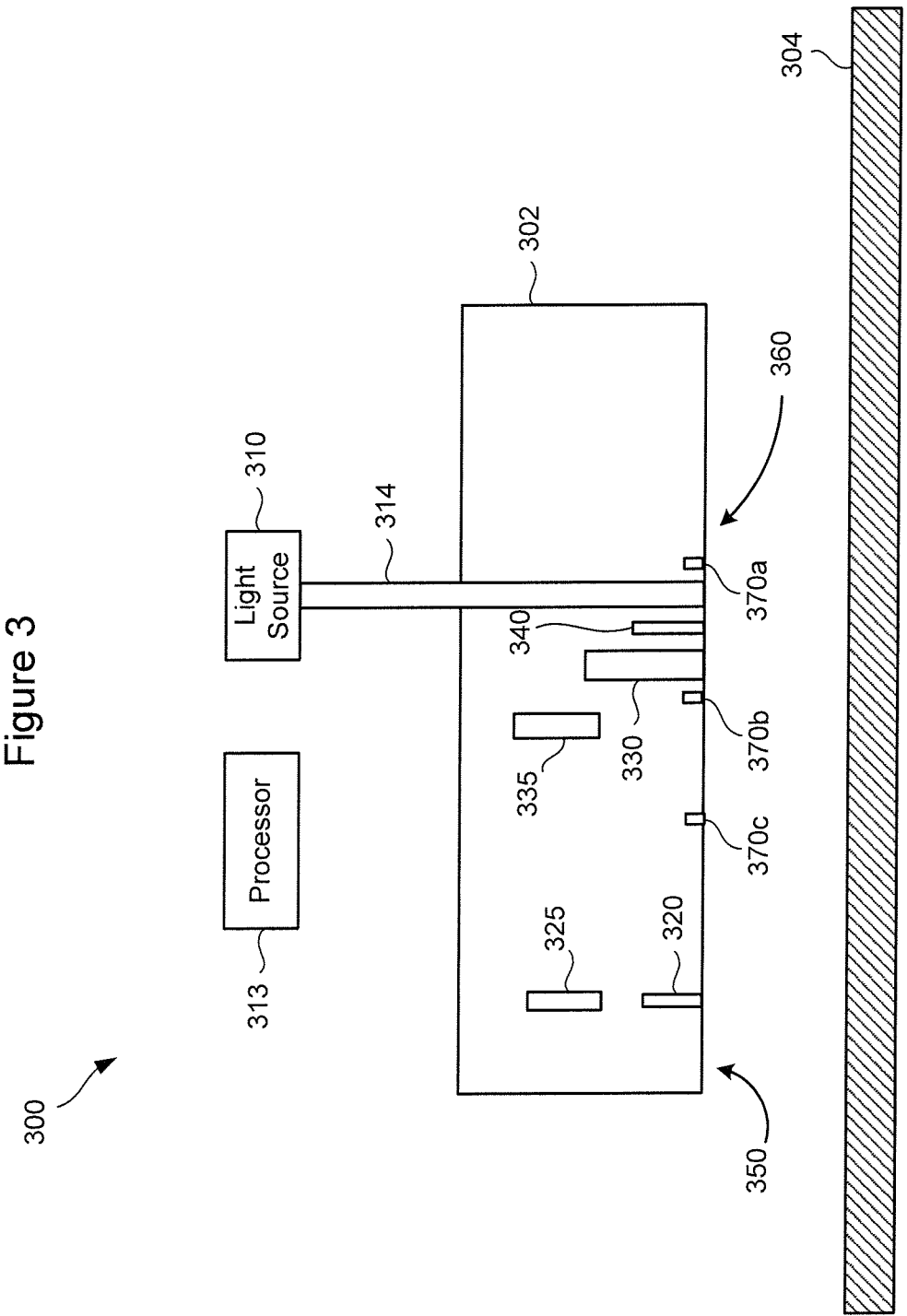
FIG. 3 is a block diagram of an apparatus for monitoring optical intensity of a light source adapted for use in heat assisted magnetic recording in accordance with various embodiments.

FIG. 3 shows a representative HAMR head transducer arrangement 300 for measuring and monitoring intensity of optical power of light delivered by a light source in accordance with various embodiments. The head transducer arrangement 300 includes a recording head transducer 302 comprising a slider 350 positioned proximate a rotating magnetic medium 304. The magnetic medium 304 is configurable for reading and/or writing data with head transducer 302. The surface of head transducer 302 facing magnetic medium 304 includes an air bearing surface (ABS) 360.

The head transducer 302 includes a reader 320 and a writer 330 proximate the ABS 360 for respectively reading and writing data from/to the magnetic medium 304. The writer 330 is configured for heat assisted magnetic recording and is located proximate a light delivery arrangement including light source 310 (e.g., laser diode). Light source 310 can be mounted external, or integral, to the head transducer 302. Light source 310 energizes a near-field transducer (NFT) 340 via a waveguide 314 proximate the ABS 360 and writer 330 respectively.

The writer 330 includes a corresponding heater 335, and reader 320 also includes a corresponding heater 325 according to various embodiments. Each of the heaters 325, 335 is thermally coupled to head transducer 302 and may be a resistive heater that generates heat in response to passage of electrical current. A processor 313 can be configured to adjust the power supplied to heaters 325, 335. For example, power supplied to heater 335 can be adjusted when NFT 340 and/or writer 330 is activated to adjust the spacing between ABS 360 and magnetic medium 304.

Processor 313 is configured to measure and monitor the optical power of light delivered by the light source 310 in accordance with various embodiments. Processor 313 may also be configured to adjust power (e.g., current) supplied to the light source 310 in order to change the optical power of light delivered by the light source 310 in accordance with various embodiments, such as during a calibration procedure. Processor 313 may further be configured to measure and adjust head-media spacing and/or clearance, such as in response to slider deformation resulting from changes in light source heating over time in accordance with various embodiments. Processor 313 can also be configured to detect head-media contact, voids, and thermal asperities in accordance with some embodiments.

The embodiment illustrated in FIG. 3 shows a thermal sensor(s) 370 (370a, 370b, 370c) situated at or near the ABS 350 of the slider 350. Some embodiments of the slider 350 include a single thermal sensor (e.g., sensor 370a), while other embodiments include a multiplicity of individual thermal sensors (e.g., any combination of sensors 370a-c). One or more of the thermal sensors 370a-c can be configured for measuring a short time-scale change in thermal sensor temperature indicative of direct light source heating. One or more of the thermal sensors 370a-c can be configured for measuring a long time-scale change in thermal sensor temperature indicative of light source body heating.

In embodiments that incorporate a single thermal sensor 370 to measure short time-scale temperature changes of the sensor (alone or in combination with measuring long time-scale thermal sensor temperature changes), this sensor is situated at a location sufficiently close to the optical path or a component in or near the optical path so that a short time-scale change in thermal sensor temperature indicative of direct light source heating can be measured. With reference to FIG. 3, for example, thermal sensor 370a is situated sufficiently close to waveguide 314 and/or NFT 340 to measure a short time-scale change in thermal sensor temperature indicative of direct light source heating. In this illustrative example, thermal sensor 370c may be situated too far away from the optical path or heat generating optical component to measure a short time-scale change in thermal sensor temperature. However, thermal sensor 370c can be used to measure a long time-scale change in thermal sensor temperature indicative of light source body heating.

In accordance with embodiments that utilize a multiplicity of thermal sensors, any combination of thermal sensors 378 (a-c) can be employed for measuring short and long time-scale changes in thermal sensor temperature. At least one of the thermal sensors 378(a-c) is situated at a location sufficiently close to the optical path or a component in or near the optical path so that a short time-scale change in thermal sensor temperature indicative of direct light source heating can be measured, as discussed above. According to some embodiments, at least one thermal sensor 370a is configured for measuring a short time-scale change in thermal sensor temperature, while one or more other components of the head transducer 302 are configured for measuring a long time-scale temperature change. For example, a writer 330 and/or writer heater 335 can serve as a long time-scale temperature change sensor, in addition to performing their normal functions. It is noted that the writer 330 and writer heater 335 are typically situated too distant from the optical path or heat generating optical component to measure a short time-scale temperature change indicative of direct light source heating. Depending on a particular slider design, however, an existing component of the head transducer 302 (e.g., writer 330) can serve as a thermal sensor that measures a short time-scale temperature change indicative of direct light source heating. In some embodiments, a reference thermal sensor (not shown) situated away from the ABS 350 can be incorporated into the head transducer 302. Such a reference thermal sensor allows for differential temperature measurements to be made, for example.

According to some embodiments, a thermal sensor 370 can be situated a distance ranging from about 0 to 5 μm from the NFT 340, such as less than about 1 μm. In other embodiments, a thermal sensor 370 can be situated a distance ranging from about 0 to 5 μm from the writer (e.g., writer pole) 330, such as less than about 1 μm. In further embodiments, a thermal sensor 370 can be situated a distance ranging from about 0 to 5 μm from the waveguide 314, such as less than about 1 μm. In this case, the thermal sensor 370 would be situated near the focus of the light source (e.g., the NFT 340) to obtain a signal useful for determining if the light is reaching the intended focus. In some embodiments, the thermal sensor 370 can be situated inside the slider body 350 and away from the ABS 350. According to various embodiments, a thermal sensor 370 can be situated at any combination of these locations, providing for temperature sensing by a multiplicity of thermal sensors 370.

Although thermal sensor 370 can be implemented using different technologies, thermal sensor 370 is described herein as a resistance temperature sensor composed of materials having a temperature coefficient of resistance (TCR). Other types of thermal sensors can be employed, such as a varistor or a thermocouple, for example. One example of a TCR sensor is a dual-ended temperature coefficient of resistance sensor (DETCR), in which each end is coupled to a bias source (e.g., bond pad of the head transducer). Another example of a TCR sensor is a ground-split (GS) temperature coefficient of resistance sensor, in which one end of the GSTCR is coupled to ground and the other is coupled to a bias source. A TCR sensor measures temperature change by measuring the change in resistance, or rate of change in resistance, across the sensor. The thermal sensor 370 situated near or at the ABS 360 measures the temperature change at ABS 360 induced by all thermal condition changes from air pressure, clearance, head operation, and contact, among other changes. When properly located in, at or near the light path as described herein, thermal sensor 370 is configured to sense a change in temperature resulting from direct light source heating, wherein the sensed change in thermal sensor temperature is representative of optical power of light delivered by the light source. After about 50 ms, thermal sensor 370 will also sense a change in temperature resulting from long time-scale heating from light source body heating.

As discussed previously, there is waste heat dissipation from the light source 310 (e.g., laser diode body) itself that can impact the performance of the interface between the head transducer 302 and the magnetic recording medium 304. One or more of the resistive components in the slider body 350 can serve to measure a long time-scale change in temperature resulting from light source body heating. Suitable thermal sensors of the head transducer 302 can include any of the resistive components in the slider body 350 including, for example, any of thermal sensor 370a-c, writer 330, writer heater 335, reader heater 325).

Figure 4:
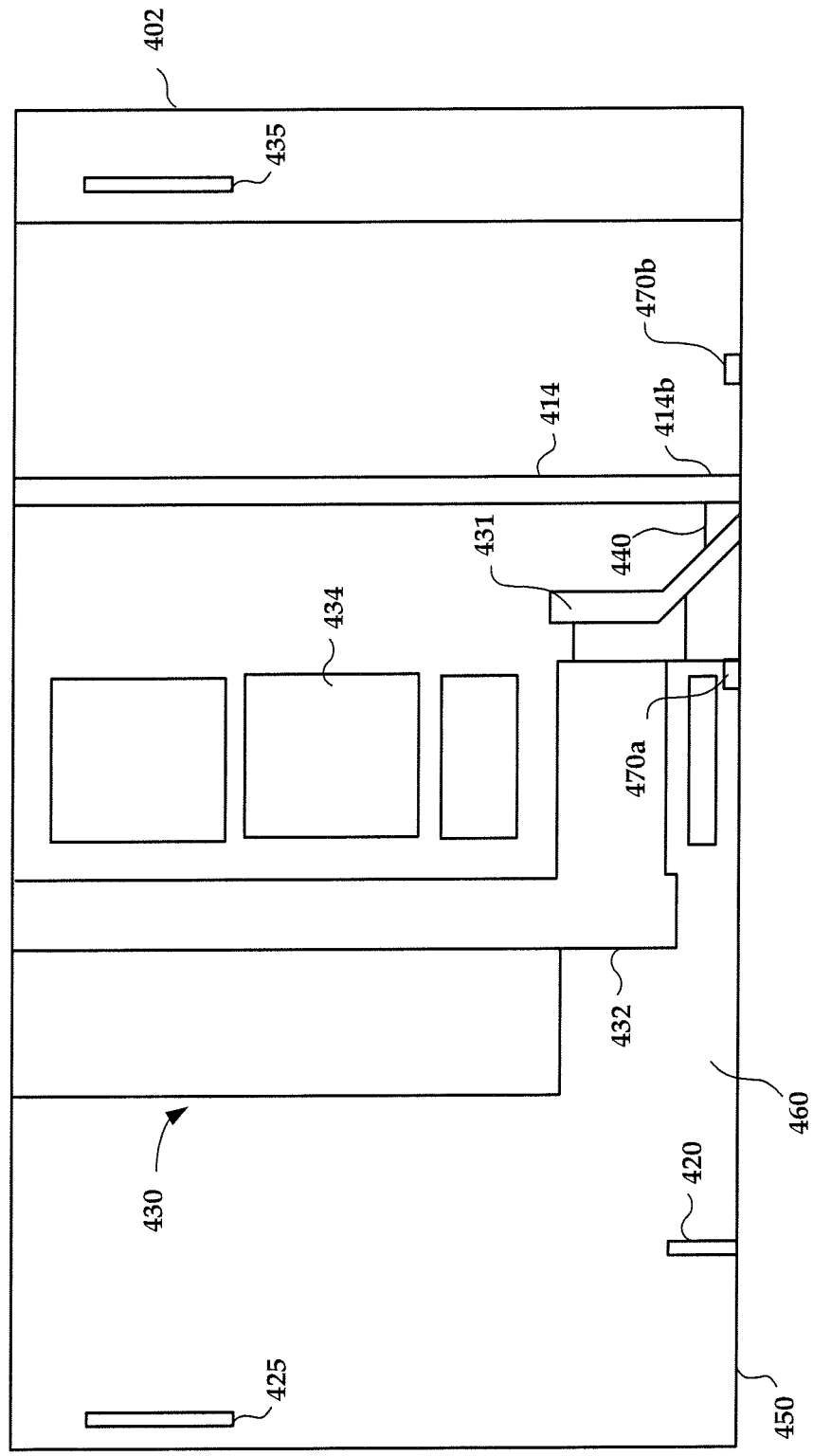
FIG. 4 is a block diagram of an apparatus for monitoring optical intensity of a light source adapted for use in heat assisted magnetic recording in accordance with various embodiments.

FIG. 4 depicts detailed structures and features that may be included in a HAMR head transducer in accordance with various embodiments. FIG. 4 shows a cross-section of a head transducer 402 in accordance with various embodiments. The head transducer 402 incorporates a writer 430 which includes a write coil 434, a write pole 431, and a write return pole 432. Other components of the head transducer 402 include a reader 420, a reader heater 425, and a writer heater 435. Optical components of the head transducer 402 include a waveguide 414 optically coupled to an NFT 440.

The NFT 440 may be a suitably sized pin or other structure and may be made of a metal such as gold or other suitable materials. The NFT 440 is shown in FIG. 4 to be close to, but separated from, waveguide 414. According to some embodiments, the head transducer 402 may incorporate a laser-in-slider device (not shown) that includes a laser soldered to the slider 460. In one illustrative example, an edge-emitting laser diode can be integrated into a trailing edge surface of the slider 460. The laser diode, in this case, may be positioned within a cavity on the slider 460 and soldered to the slider 460. According to other embodiments, the head transducer 402 may incorporate a laser-on-slider (also referred to as laser-on-substrate) device (not shown), in which the laser diode module is mounted on an upper surface of the head transducer 402 and optically coupled to the waveguide 414. In other embodiments, the NFT 440 may be disposed within the waveguide 414. In still other embodiments, a light source (not shown) may be integrated into the head transducer 402 and the waveguide 414 may be omitted. In an integrated laser configuration, the NFT 440 may couple directly to the integrated semiconductor laser.

Writing to a HAMR magnetic recording medium involves heating a spot of the medium directly by the NFT 440 and indirectly by the light source. Heating of the spot to a specified temperature (e.g., Currie temperature) reduces the coercivity of the magnetic material so that the magnetic field from the magnetic write pole 431 is strong enough to change the magnetization direction at the spot. When the laser is energized, laser light is emitted from the laser and coupled into the waveguide 414. The laser light is conveyed to a distal end 414b of the waveguide 414. In some cases, the distal end 414b may correspond to a focal point or focal region of a solid immersion mirror (SIM) or a solid immersion lens (SIL). Located at or near the distal end 414b is the NFT 440, which utilizes plasmons to convert the power density of the incident laser light into a high power density in a near-field region that is typically smaller than the diffraction limit for the laser light. The high power density provided by the NFT 440 in the near-field region is absorbed by the adjacent magnetic recording medium to produce localized heating of the spot. By positioning an emitting end of the NFT 440 close enough to the write pole 431 of the writer 430, at least a portion of the heated spot can be exposed to the high magnetic flux emitted by the write pole 431 before passing out of range (due to the relative motion of the magnetic recording medium) so that the magnetic field at the write pole 431 is capable of changing the magnetization direction of the spot.

FIG. 4 further shows a thermal sensor 470 situated at two different locations 470a, 470b at or near the ABS 450 of the slider 460. At either of these two locations, a thermal sensor 470 is sufficiently close to the laser light path or a heat generating optical component to measure a change in thermal sensor temperature representative of optical power of light delivered by the light source. It is understood that other thermal sensor locations within the head transducer 402 are suitable for measuring optical power of light delivered by the light source. In some embodiments, as previously discussed, the head transducer 402 can incorporate a multiplicity of thermal sensors, some of which may take the form of existing resistive components of the head transducer 402. In such embodiments, at least one of the thermal sensors is positioned near the optical path or a heat generating component coupled to the optical path and configured for measuring direct light source heating by the laser diode. One or more of the other thermal sensors or existing resistive components can be located at other locations within the head transducer 404 and configured for measuring slider heating by the laser diode body (i.e., waste heat).

According to some embodiments, the response of thermal sensor 470 is measured by using a constant current bias and monitoring the voltage change as a function of time. The bias current for a particular sensor can be selected so as to match the sensor's cold resistance and increase or optimize the magnitude of the resistance change. Common electric circuits can be used to remove the DC offset from the sensor bias to allow amplification of the signal of interest.

Figure 5:
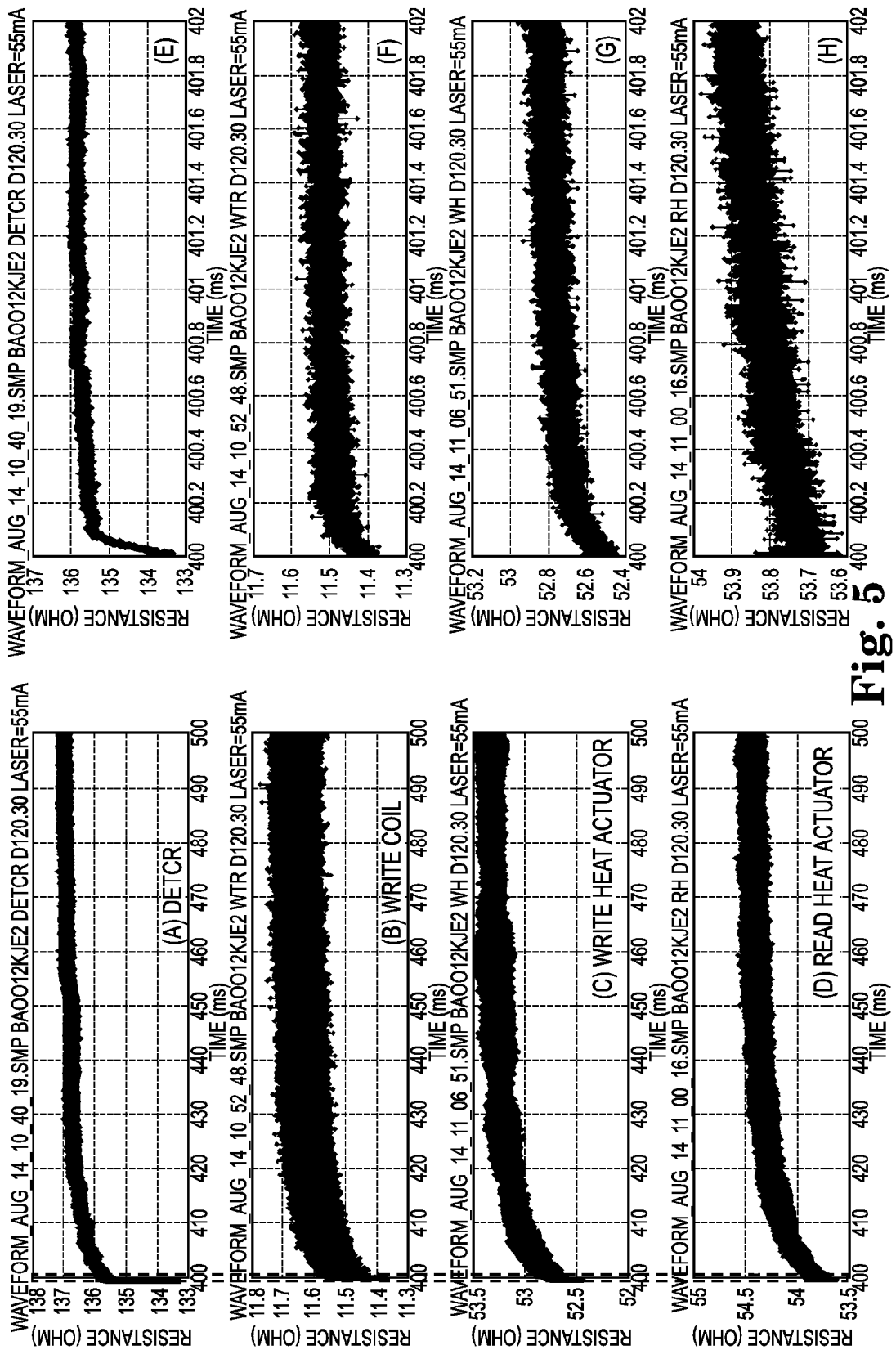
FIG. 5 shows resistive measurements made using four biased thermal sensors situated in a head transducer adapted for use in heat assisted magnetic recording in accordance with various embodiments.

FIG. 5 shows resistive measurements (sensor resistance vs. time) using a DC coupled measurement of four biased thermal sensors in a head transducer, such as that shown in FIG. 4. FIGS. 5a-d show the first 100 ms of signals generated by the four biased thermal sensors. FIGS. 5e-h show the first 2 ms of the signal waveforms respectively shown in FIGS. 5a-d. For purposes of illustration, the signal waveforms shown in FIGS. 5a-d correspond to signals generated by thermal sensor 470, write coil 434, writer heater 435, and reader heater 425, respectively (as shown in FIG. 4). The signals of FIGS. 5a-d (and corresponding signals of FIGS. 5e-h) produced by all four thermal sensors have a long time-scale heating profile that corresponds to heat generated by the laser diode body (waste heat).

Of the four sensor signal waveforms shown in FIG. 5, only the signal content of the waveform shown in FIG. 5a includes a short time-scale change indicative of direct light source heating by the laser diode. FIG. 5e, which shows the first 2 ms of the signal waveform of FIG. 5a, clearly shows a short time-scale change (initial jump of about 0.2 ms) indicating that the thermal sensor at the locations shown in FIG. 4 (470a or 470b) is sensitive to direct light source heating by the laser diode. It can be seen in FIGS. 5a-h that all thermal sensors show a longer time-scale (of about 50 ms) change in resistance. This change is associated with light source body heating which can produce head disk clearance changes over many disk revolutions. In this case, any of the thermal sensors (e.g., sensors 470a and/or 470b, write coil 434, writer heater 435, and reader heater 425) can be used to monitor heating of the head transducer by waste heat generated by the laser diode body.

Figure 6B:
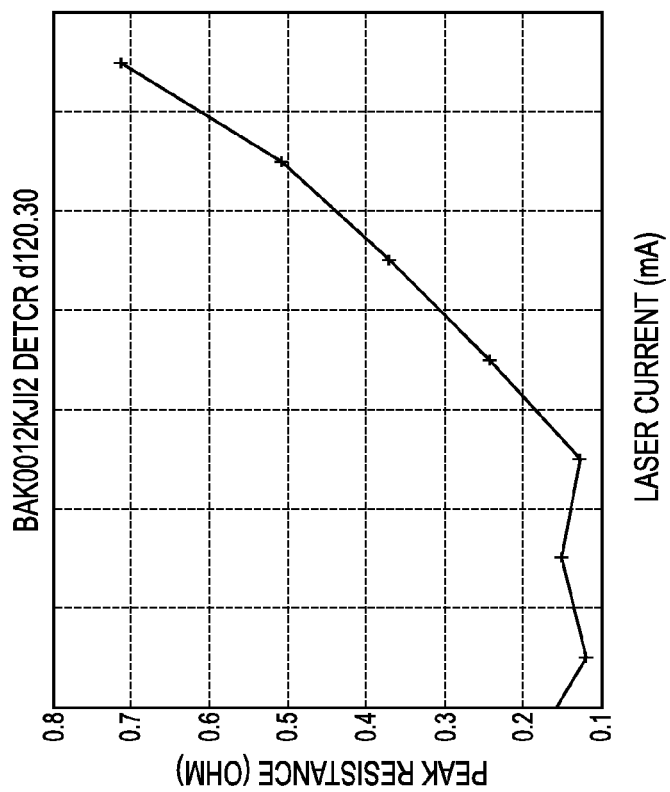
FIGS. 6A and 6B show measurements illustrating changes in resistance of a thermal sensor shown in FIG. 4 serving as a laser power monitor in accordance with various embodiments.
Figure 6A:
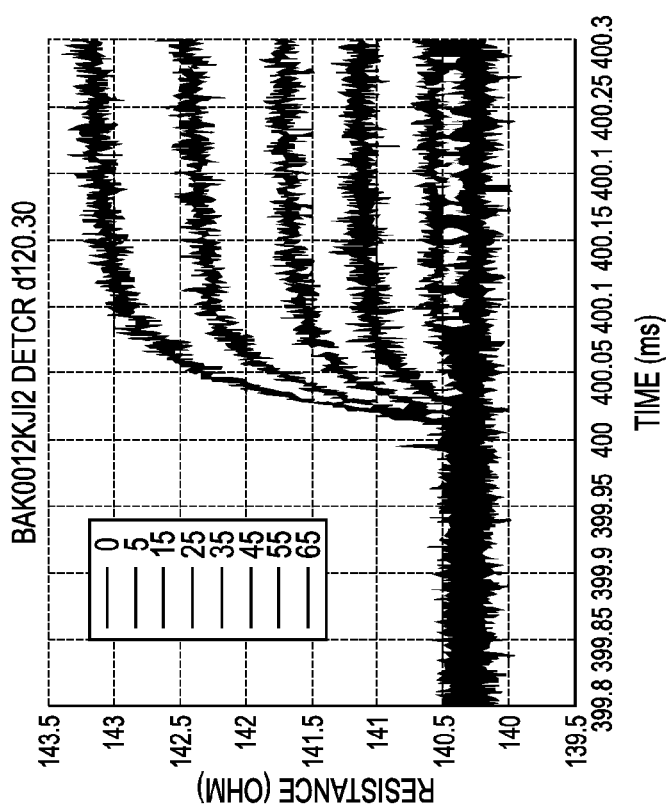

In general, the optical power of a laser diode increases with diode bias current after a given threshold (e.g., about 25 mA). FIGS. 6A and 6B show measurements illustrating the change in resistance of a thermal sensor at the locations shown in FIG. 4 (470a or 470b) serving as a laser power monitor. The resistance changes illustrated in FIGS. 6A and 6B show the expected linear increase with laser current after the lasing threshold is reached. In some embodiments, a modulated laser signal is used to measure the change in resistance with laser power. In this case, the laser current is cycled on and off at a specified frequency. Either hardware lock-in circuitry or software locking can be used to measure the resistance change only at the modulation frequency. This results in greatly reducing or eliminating electrical noise at frequencies other than the laser modulation frequency.

Figure 7:
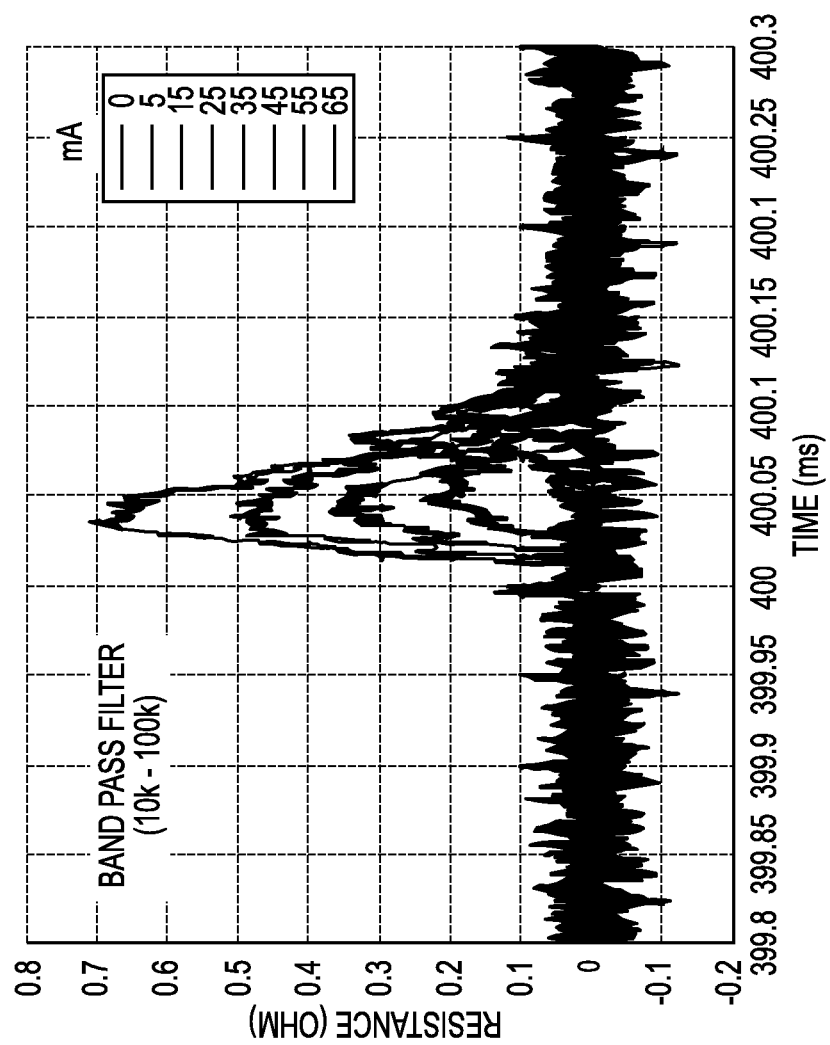
FIG. 7 shows a result of running the signals shown in FIG. 6A through a bandpass filter for laser power monitoring in accordance with various embodiments.

The change in resistance can also be run through a bandpass filter, as well as using a DC coupled measurement as has been discussed hereinabove. FIG. 7 shows the result of running the signals shown in FIG. 6A through a bandpass filter. In this case, the peak of the signal is proportional to the rate of resistance change with time. The peak of the signal can be used as a diode power detector similar to the DC coupled case previously discussed.

Figure 8:
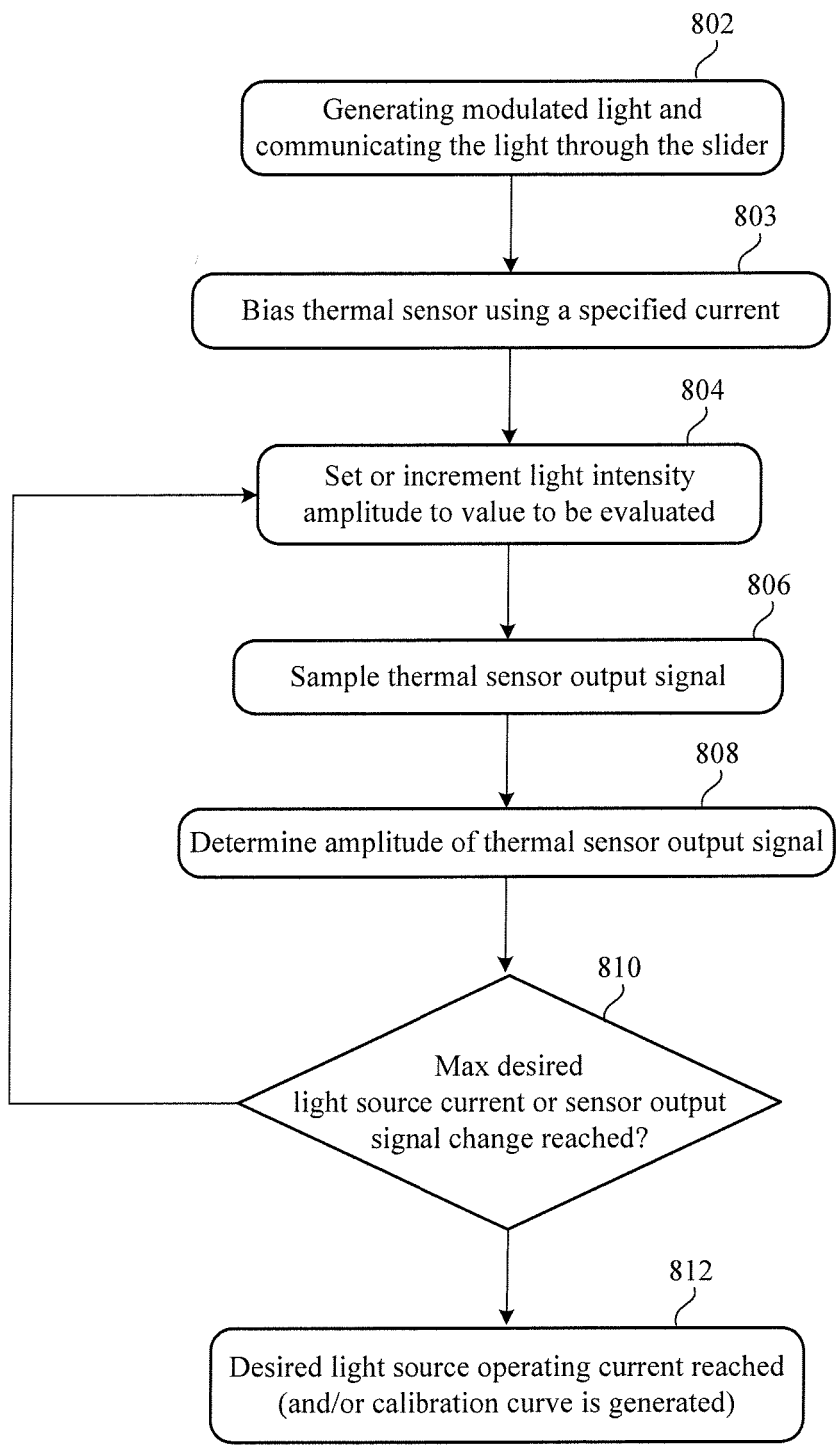
FIG. 8 is a flow chart showing various processes for monitoring optical intensity of a light source adapted for use in heat assisted magnetic recording in accordance with various embodiments.

FIG. 8 is a flowchart illustrating various processes involving measuring and adjusting laser light intensity in accordance with various embodiments. The methodology illustrated in FIG. 8 is associated with measuring a resistance change or delta in a thermal sensor in accordance with the approach shown in FIG. 6A as discussed previously. The representative method shown in FIG. 8 involves generating 802 modulated laser light and communicating the light through the slider. A thermal sensor at the slider is situated sufficiently close to the optical path of the laser light to sense a short time-scale change in resistance due to direct light source heating. The method involves biasing 803 the thermal sensor using a specified current.

The method illustrated in FIG. 8 further involves setting or incrementing 804 laser light intensity amplitude to a specified value to be evaluated. The method also involves sampling 806 an output signal produced by a thermal sensor provided at the slider and in proximity to the optical path of the laser light, and determining 808 the amplitude of the thermal sensor output signal. A check 810 is made to determine if the maximum desired laser current or thermal sensor output signal change has been reached. It is noted that either a desired laser current or desired amplitude of the thermal sensor output signal can be used as a threshold. If the maximum desired laser current or thermal sensor output signal change has not been reached, processing is returned to block 802. If the maximum desired laser current or thermal sensor output signal change has been reached, an output is generated that indicates that the desired laser operating current has been reached 812, and/or a calibration curve is generated reporting same.

Figure 9:
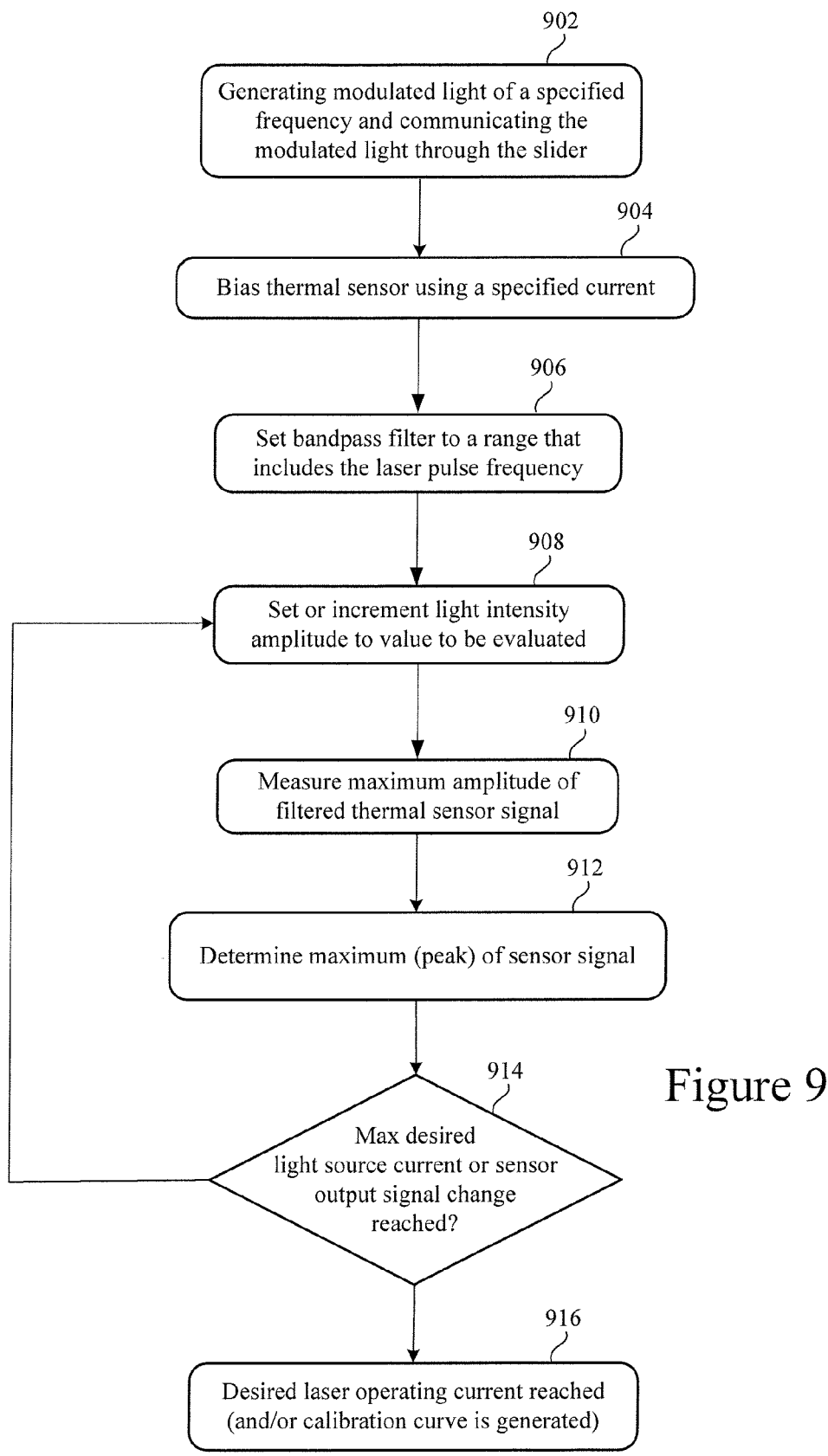
FIG. 9 is a flow chart showing various processes for monitoring optical intensity of a light source adapted for use in heat assisted magnetic recording in accordance with various embodiments.

FIG. 9 is a flowchart illustrating various processes involving measuring and adjusting laser light intensity in accordance with various embodiments. The methodology illustrated in FIG. 9 is associated with measuring a resistance change in a thermal sensor using a filtering approach in accordance with the approach shown in FIG. 7 as discussed previously. The representative method shown in FIG. 9 involves generating 902 modulated laser light and communicating the light through the slider. A thermal sensor at the slider is situated sufficiently close to the optical path of the laser light to sense a short time-scale change in resistance due to direct light source heating. The method involves biasing 904 the thermal sensor using a specified current. The method further involves setting 906 a bandpass filter to range that includes the laser pulse frequency.

The methodology illustrated in FIG. 9 further includes setting 908 or incrementing laser light intensity amplitude to a specified value to be evaluated. The method also involves measuring 910 the maximum (peak) amplitude of the bandpass filtered thermal sensor signal. Various known techniques can be used to measure the peak of the bandpass filtered signal, including using a comparator circuit or sampling the signal using an analog-to-digital converter for example. Using the maximum value of the thermal sensor signal, a check is made 914 to determine if the maximum desired laser current or sensor output signal change has been reached. If not, processing is returned to block 908. If so, an output indicates that the desired laser operating current has been reached 916, and/or that a calibration curve is generated reporting same.

Figure 10:
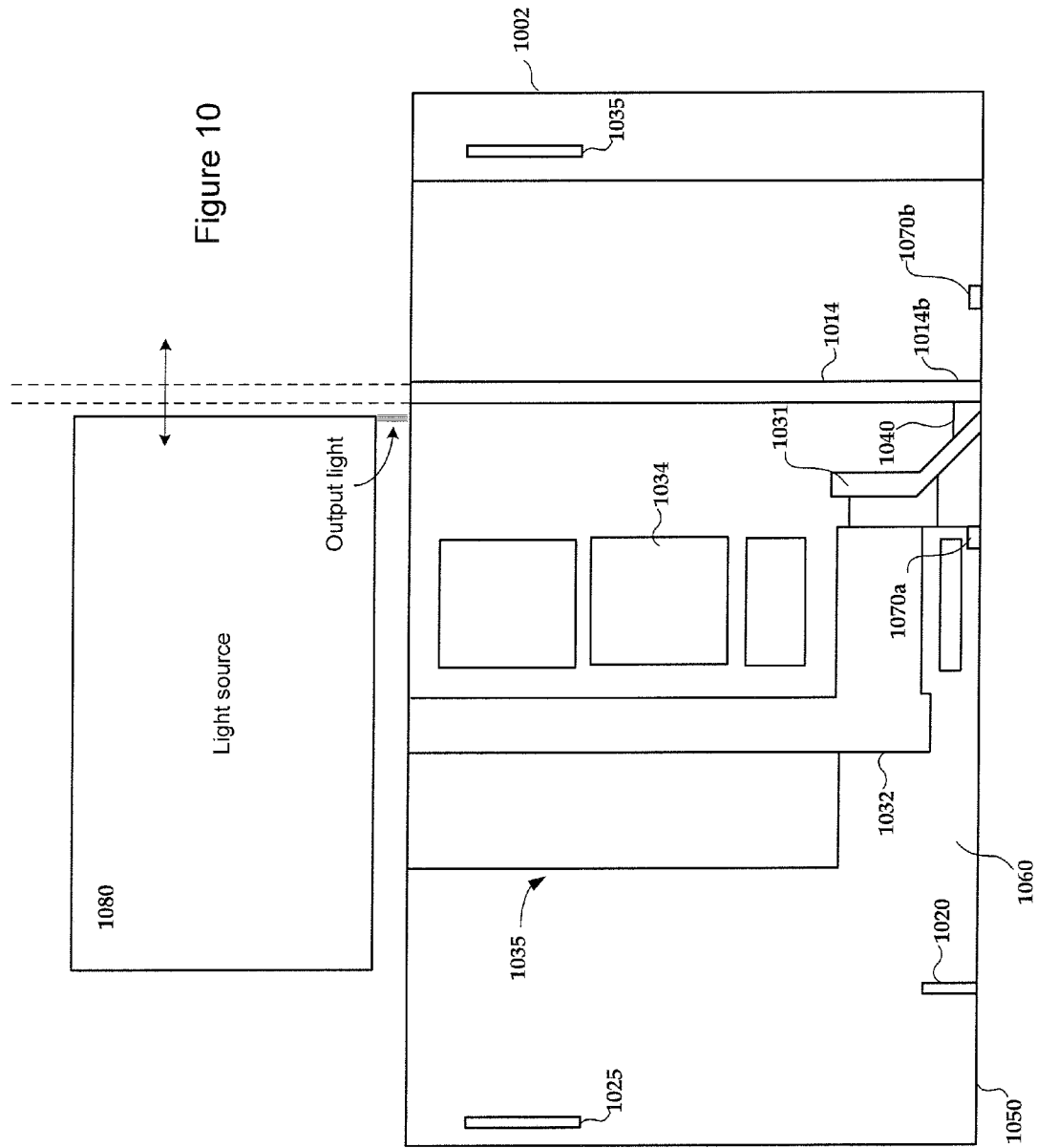
FIG. 10 is a block diagram of an apparatus for monitoring optical intensity of a light source adapted for use in heat assisted magnetic recording during a light source-head transducer alignment procedure in accordance with various embodiments.

FIG. 10 shows a HAMR head transducer 1002 and a light source 1080 in accordance with various embodiments of the disclosure. In FIG. 10, the light source 1080 is being positionally adjusted in order to properly aligned the light source 1080 with a waveguide 1014 of the head transducer 1002. The apparatus shown in FIG. 10 is representative of a laser-on-slider (or laser-on-substrate) configuration. In this illustrative embodiment, the position of the light source 1080 is being moved with high precision in order to properly align the light source 1080 and the waveguide 1014 of the head transducer 1002. It can be appreciated that proper alignment between the light source 1080 and the waveguide 1014 provides for efficient transmission of optical power from the light source 1082 to NFT 1040 via the waveguide 1014. It is noted that the procedure of positionally aligning the light source 1080 and head transducer 1002 occurs during manufacture of the apparatus.

According to various embodiments, a thermal sensor of the head transducer 1002 (e.g., thermal sensor 1070 in position 1070a or 1070b) is used to indirectly measure the intensity of laser optical power transmitted through the optical path between the light source 1080 and NFT 1040 via waveguide 1014. Because thermal sensor 1070 is sufficiently close to the optical path to be sensitive to short time-scale changes in resistance indicative of direct light source heating, the output signal of thermal sensor 1070 can be used to ensure proper alignment between the light source 1080 and head transducer 1002. For example, a peak amplitude of the thermal sensor signal can be detected and monitored while the position of light source 1080 is being moved during an alignment procedure. The amplitude of the thermal sensor signal will increase and decrease as the position of the light source 1080 moves into and out of proper alignment, respectively. When a threshold (e.g., maximum) thermal sensor signal amplitude is reached, proper (e.g., optimal) alignment between the light source 1080 and head transducer 1002 has been achieved. Any of the methods described herein can be employed to determine the maximum thermal sensor signal amplitude during a laser-head transducer alignment procedure. It is understood that such procedures may be employed for head transducer arrangements other than a laser-on-slider configuration.

In various embodiments discussed above, one or more thermal sensors of a slider are used to detect a short time constant (i.e., short time-scale) signal indicative of direct heating by light generated by a light source. A thermal sensor positioned and configured to be sensitive to such a short time constant change is described above as situated sufficiently near the optical path or laser focus to be sensitive to short time constant changes in resistance indicative of direct light source heating rather than waste heat generated by the light source. In some embodiments, a thermal sensor of a type described herein can be situated directly in the path of the laser light, but not in the light's intended focus. A thermal sensor situated directly in the laser light path, but not in the light's intended focus, can serve as a laser power monitor and can also detect that the light is properly focused at its intended target location. The above-described techniques for sensing and monitoring optical power of a light source for a HAMR head transducer can be applied in embodiments that employ a thermal sensor situated directly in the laser light path, but not in the light's intended focus.

It is to be understood that even though numerous characteristics of various embodiments have been set forth in the foregoing description, together with details of the structure and function of various embodiments, this detailed description is illustrative only, and changes may be made in detail, especially in matters of structure and arrangements of parts illustrated by the various embodiments to the full extent indicated by the broad general meaning of the terms in which the appended claims are expressed.

What is claimed is:

1. An apparatus, comprising:
a light source configured to produce light;
a slider configured to communicate the light to a near-field transducer that uses the light as an energy source for heating a region of a magnetic recording medium;
a thermal sensor situated on the slider at a location unexposed to the light and configured for sensing a change in temperature resulting from direct heating of the thermal sensor by the light, wherein the sensed change in thermal sensor temperature is representative of optical intensity of the light delivered by the light source;
a circuit coupled to the thermal sensor and configured to measure a change in resistance of the thermal sensor in response to the sensed change in thermal sensor temperature; and
a processor coupled to the circuit and configured to:
compare the measured change in resistance to a threshold indicating that desired light intensity is being delivered; and
produce a signal indicating whether or not the threshold has been reached.

2. The apparatus of claim 1, wherein the thermal sensor is configured for:
sensing the change in temperature resulting from direct heating of the thermal sensor; and
sensing a change in temperature resulting from light source heating of the slider adjacent the thermal sensor.

3. The apparatus of claim 1, wherein:
the thermal sensor is configured for sensing the change in temperature resulting from direct heating of the thermal sensor; and
a component of the slider other than the thermal sensor is configured for sensing a change in temperature resulting from light source heating of the slider adjacent the component.

4. The apparatus of claim 1, wherein the thermal sensor comprises a sensor element having a temperature coefficient of resistance.

5. The apparatus of claim 1, wherein:
the slider comprises an air bearing surface; and
the thermal sensor is situated at or near the air bearing surface.

6. The apparatus of claim 1, wherein:
the slider comprises:
an air bearing surface;
the near-field transducer is situated at or near the air bearing surface;
a waveguide optically coupling the light source and the near-field transducer; and
the thermal sensor is situated at or near the air bearing surface proximate the near-field transducer.

7. The apparatus of claim 1, wherein:
the slider comprises:
an air bearing surface;
a writer comprising a writer pole at or near the air bearing surface;
a writer heater proximate the writer;
the near-field transducer is situated at or near the air bearing surface and proximate the writer pole;
a waveguide optically coupling the light source and the near-field transducer; and
the thermal sensor is situated at or near the air bearing surface proximate the near-field transducer or the writer pole;
wherein at least the writer pole and the thermal sensor are configured for thermal actuation by the writer heater.

8. The apparatus of claim 1, further comprising a processor coupled to the thermal sensor and configured to monitor optical intensity of the light delivered by the light source using the sensed change in thermal sensor temperature.

9. The apparatus of claim 1, wherein the threshold comprises a desired light source current.

10. The apparatus of claim 1, wherein the threshold comprises a desired thermal sensor resistance change amplitude.

11. An apparatus, comprising:
a light source configured to produce light and to modulates the light at a specified frequency;
a slider configured to communicate the light to a near-field transducer that uses the light as an energy source for heating a region of a magnetic recording medium;
a thermal sensor situated on the slider at a location unexposed to the light and configured for sensing a change in temperature resulting from direct heating of the thermal sensor by the light, wherein the sensed change in thermal sensor temperature is representative of optical intensity of the light delivered by the light source;
circuitry configured to measure, at the specified frequency, a change in resistance of the thermal sensor corresponding to the change in thermal sensor temperature; and
a processor coupled to the circuitry and configured to compare the measured change in thermal sensor resistance to a threshold indicating that desired light intensity is being delivered.

12. The apparatus of claim 11, wherein:
the circuitry comprises a bandpass filter having a passband that includes the specified frequency, the bandpass filter configured to output a signal representative of the change in thermal sensor resistance at the specified frequency; and
the processor is configured to measure a peak of the output signal.

13. An apparatus, comprising:
a light source configured to produce light;
a waveguide optically coupled to the light source and configured to direct the light to an intended focus location;
a slider configured to use the light as an energy source for heating a region of a magnetic recording medium; and
a thermal sensor situated on the slider at a location outside of a light path that includes the intended focus location, the thermal sensor configured for sensing a change in temperature resulting from light source heating of the thermal sensor within about 2 milliseconds after the light source has powered on, wherein the sensed change in thermal sensor temperature is representative of optical intensity of the light delivered to the intended focus location.

14. The apparatus of claim 13, wherein:
   the slider comprises a near-field transducer optically coupled to the waveguide; and
   the intended focus location comprises a location of the near-field transducer.

15. The apparatus of claim 13, wherein the thermal sensor is configured for sensing a change in temperature resulting from light source heating of the thermal sensor within about 200 microseconds after the light source has powered on.

16. The apparatus of claim 13, wherein the thermal sensor is configured for sensing a change in temperature resulting from light source heating of the thermal sensor within about 1 microsecond after the light source has powered on.

17. A method, comprising:
   generating light by a light source situated in, at, or near a slider;
   communicating the light from the light source, through the slider, and to an intended focus location of the slider; and
   sensing, by a thermal sensor at the slider, a change in temperature resulting from direct heating of the thermal sensor by the light within about 2 milliseconds after the light source has powered on, wherein the sensed change in thermal sensor temperature is representative of optical intensity of the light delivered to the intended focus location.

18. The method of claim 17, comprising monitoring for changes in optical intensity of the light over time using sensed changes in temperature resulting from direct heating of the thermal sensor by the light.

* * * * *